(12) United States Patent
Zhang et al.

(10) Patent No.: US 10,372,717 B2
(45) Date of Patent: *Aug. 6, 2019

(54) SYSTEMS AND METHODS FOR IDENTIFYING DOCUMENTS BASED ON CITATION HISTORY

(71) Applicant: LexisNexis, a division of Reed Elsevier Inc., Miamisburg, OH (US)

(72) Inventors: Paul Zhang, Centerville, OH (US); Harry R. Silver, Shaker Heights, OH (US)

(73) Assignee: LexisNexis, a division of Reed Elsevier Inc., Miamisburg, OH (US)

( * ) Notice: Subject to any disclaimer, the term of this patent is extended or adjusted under 35 U.S.C. 154(b) by 135 days.

This patent is subject to a terminal disclaimer.

(21) Appl. No.: 14/922,585

(22) Filed: Oct. 26, 2015

(65) Prior Publication Data

US 2016/0098407 A1 Apr. 7, 2016

Related U.S. Application Data

(63) Continuation of application No. 13/755,874, filed on Jan. 31, 2013, now Pat. No. 9,201,969.

(51) Int. Cl.
*G06F 17/30* (2006.01)
*G06F 16/2457* (2019.01)
(Continued)

(52) U.S. Cl.
CPC ........ *G06F 16/24578* (2019.01); *G06F 16/93* (2019.01); *G06F 16/9535* (2019.01)

(58) Field of Classification Search
CPC ......... G06F 17/30705; G06F 17/30722; G06F 17/30728; G06F 17/30861;
(Continued)

(56) References Cited

U.S. PATENT DOCUMENTS 5,819,260 A 10/1998 Lu et al.
5,926,811 A 7/1999 Miller et al.
(Continued)

FOREIGN PATENT DOCUMENTS

EP 1050830 11/2000

OTHER PUBLICATIONS

PCT Notification of Transmittal of the International Search Report and Written Opinion of the International Searching Authority, or the Declaration for the International Application No. PCT/US2014/013516; dated Mar. 31, 2014, Soliman, Ahmed of the European Patent Office, P. B. 5818 Patentiaan 2 NL-2280 HV Rijswijk.
(Continued)

*Primary Examiner* — Hares Jami
(74) *Attorney, Agent, or Firm* — Dinsmore & Shohl, LLP

(57) ABSTRACT

Systems, methods, and computer-executable instructions for identifying a document are described. A method includes receiving a query from a graphical user interface having one or more concepts, normalizing a set of terms or concepts in the query to create a normalized query, comparing the normalized query to a set of document centric concept profiles associated with a set of documents in a corpus, where each document centric concept includes a plurality of concepts and at least one reference value for each concept, where the reference value is calculated by tabulating the number of times a document associated with one of the document centric concept profiles is cited by a citing instance for the concept, and surfacing a document from the corpus with the highest reference value for the concept.

20 Claims, 8 Drawing Sheets

(51) Int. Cl.
*G06F 16/93* (2019.01)
*G06F 16/9535* (2019.01)

(58) Field of Classification Search
CPC ......... G06F 17/30867; G06F 17/30011; G06F 17/3053; G06F 16/24578; G06F 16/93; G06F 16/9535
USPC .......... 707/713, 723, 728, 731, 732
See application file for complete search history.

(56) References Cited

U.S. PATENT DOCUMENTS

| | | | |
|---|---|---|---|
| 6,856,988 B1 | 2/2005 | Humphrey et al. | |
| 7,735,010 B2 | 6/2010 | Zhang et al. | |
| 2005/0022106 A1 | 1/2005 | Kawai et al. | |
| 2005/0203924 A1 | 9/2005 | Rosenberg | |
| 2007/0255686 A1* | 11/2007 | Kemp | G06F 17/30728 |
| 2008/0301083 A1* | 12/2008 | Zhang | G06F 17/2785 |
| | | | 706/61 |
| 2010/0268708 A1* | 10/2010 | Zhang | G06F 17/30663 |
| | | | 707/726 |
| 2011/0258202 A1* | 10/2011 | Mukherjee | G06F 17/30616 |
| | | | 707/749 |
| 2012/0054220 A1 | 3/2012 | Zhang et al. | |
| 2012/0054221 A1 | 3/2012 | Zhang et al. | |
| 2012/0054240 A1* | 3/2012 | Zhang | G06F 16/382 |
| | | | 707/780 |
| 2012/0109946 A1* | 5/2012 | Qian | G06Q 30/0601 |
| | | | 707/723 |
| 2012/0254161 A1 | 10/2012 | Zhang et al. | |
| 2014/0172904 A1* | 6/2014 | Dubbels | G06F 17/30672 |
| | | | 707/769 |

OTHER PUBLICATIONS

Solskinnsbakk G., et al.: "Combining ontological profiles with context in information retrieval," Data & Knowledge Engineering, Elsevier BV, NL, vol. 69, No. 3, Oct. 12, 2010, pp. 251-260.
Michael G. Noll, et al.: "Web Search Personalization via Social Bookmarking and Tagging," Nov. 11, 2007.
Speretta, Mirco et al.: "Personalized Search Based on User Search Histories," Web Intelligence, 2005, Proceedings of the 2005 IEEE/WIC/ACM International Conference on Web Intelligence.
Canadian Intellectual Property Office Action issued in corresponding Canadian application No. 2,899,854, dated Jun. 20, 2017.

* cited by examiner

810 — USER ENTERS A "QUERY"

Enter Your Terms: [What is a prima facie showing that the best interests of the child] [Submit]

You Entered: < What is a prima facie showing that the best interests of the child will be served in a motion to stay for child custody? >

820 — < prima facie > :
  411 U.S. 792 ...... (citied over 20190 Times) — 830
  450 U.S. 248 ...... (citied over 10172 Times) — 830
  476 U.S. 79 ...... (citied over 4998 Times) — 830

820 — < best interest > :
  462 Mich. 341 ...... (citied over 2353 Times) — 830
  56 N.Y. 2d 167 ...... (citied over 1126 Times) — 830

820 — < best interest of the child > :
  462 Mich. 341 ...... (citied over 2141 Times) — 830
  56 N.Y. 2d 167 ...... (citied over 1045 Times) — 830

820 — < interest > :
  408 U.S.564 ...... (citied over 10217 Times) — 830
  515 U.S. 472 ...... (citied over 7034 Times) — 830
  424 U.S. 319 ...... (citied over 4515 Times) — 830

820 — < interest of the child > :
  56 N.Y. 2d 167 ...... (citied over 872 Times) — 830

820 — < motion to stay > :
  544 U.S. 269 ...... (citied over 94 Times) — 830

820 — < child custody > :
  25 Cal. 3d 436 ...... (citied over 374 Times) — 830
  386 U.S. 738 ...... (citied over 322 Times) — 830

FIG. 8

Enter Your Terms: [no negligence] [Submit]

You Entered: < no negligence >

< absence of negligence > :
  68 N.Y. 320 ...... (citied over 98 Times)

FIG. 9

SYSTEMS AND METHODS FOR IDENTIFYING DOCUMENTS BASED ON CITATION HISTORY

CROSS-REFERENCE TO RELATED APPLICATIONS

This application is a continuation of U.S. patent application Ser. No. 13/755,874, entitled "Systems and Methods for Identifying Documents Based on Citation History", and filed on Jan. 31, 2013.

COPYRIGHT NOTICE

A portion of this disclosure, including Appendices, is subject to copyright protection. Limited permission is granted to facsimile reproduction of the patent document or patent disclosure as it appears in the U.S. Patent and Trademark Office (PTO) patent file or records, but the copyright owner reserves all other copyright rights whatsoever.

TECHNICAL FIELD

The present specification generally relates to data analytics and production of a result set based on an assessment of citations to a specific document for a reason for citation (RFC).

BACKGROUND

Citation is the process of acknowledging or citing the author, year, title, and locus of publication (journal, book, or other) of a source used in a published work. In professional writing, people cite other published work to provide background information, to position the current work in the established knowledge web, to introduce methodologies, and to compare results. For example, in the area of scientific research, a researcher has to cite to demonstrate his contribution to new knowledge.

Citation analysis or bibliometrics measure the usage and impact of the cited work. Among the measures that have emerged from citation analysis are the citation counts for: an individual article (how often it was cited); an author (total citations, or average citation count per article); a journal (average citation count for the articles in the journal).

Documents within a corpus are often linked together by citations. However, there is a need in the art to provide a technique that can determine which case is most frequently cited for a specific Reason for Citation (RFC).

SUMMARY

Aspects and embodiments of the systems comprise multiple levels of functionality as well as varying depth and breadth in the graphical user interfaces generated by such embodiments.

In an embodiment, a system to identify a document includes a processing device and a non-transitory, processor-readable storage. The non-transitory, processor-readable storage medium includes one or more programming instructions that, when executed, cause the processing device to receive a query from a graphical user interface having one or more concepts, normalize a set of terms or concepts in the query to create a normalized query, and compare the normalized query to a set of document centric concept profiles associated with a set of documents in a corpus. Each document centric concept profile includes a plurality of concepts and at least one reference value for each concept of the plurality of concepts, where the at least one reference value is calculated by tabulating the number of times a document associated with one of the set of document centric concept profiles is cited by a citing instance for the concept. The non-transitory, processor-readable storage medium further includes one or more programming instructions that, when executed, cause the processing device to surface a document from the corpus with the highest reference value for the concept.

In another embodiment, a method to identify a document includes automatically receiving a query from a graphical user database comprising one or more concepts. This method further includes normalizing a set of terms or concepts in the query to create a normalized query and comparing the normalized query to a set of document centric concept profiles associated with a set of documents in a corpus. Each document centric concept profile includes at least one legal term or concept and at least one reference value for each concept of the plurality of concepts, where the at least one reference value is calculated by tabulating the number of times a document associated with one of the set of document centric concept profiles is cited by a citing instance for the concept. The method further includes surfacing a document from the corpus with the highest reference value for the concept.

In another embodiment, a computer-readable medium having computer-executable instructions for execution by a computer machine to identify a document that when executed, cause the computer machine to receive a query including at least one concept. The execution of the computer-executable instructions by a computer machine compares the concept to each document centric profile of a set of document centric concept profiles contained in a computerized database, where each document centric concept profile includes a plurality of normalized concepts and, for each normalized concept, at least one reference value The execution of the computer-executable instructions by a computer machine surfaces a set of documents associated with one or more document centric concept profiles having a normalized concept that matches the at least one concept of the query and ranks the set of documents by their associated reference value scores.

These and additional features provided by embodiments described herein will be more fully understood in view of the following detailed description, in conjunction with the drawings.

BRIEF DESCRIPTION OF THE DRAWINGS

Embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 8 represents an embodiment of an exemplary interface generated for graphical display providing a query box, a breakdown of concepts based on a computer machine input received through the query box, and a result set for each concept.

FIG. 9 represents an embodiment of an exemplary interface generated for graphical display providing a query box and illustrating a sample result set based on normalization of a set of computer machine input received as query terms.

DETAILED DESCRIPTION

Figure 1:
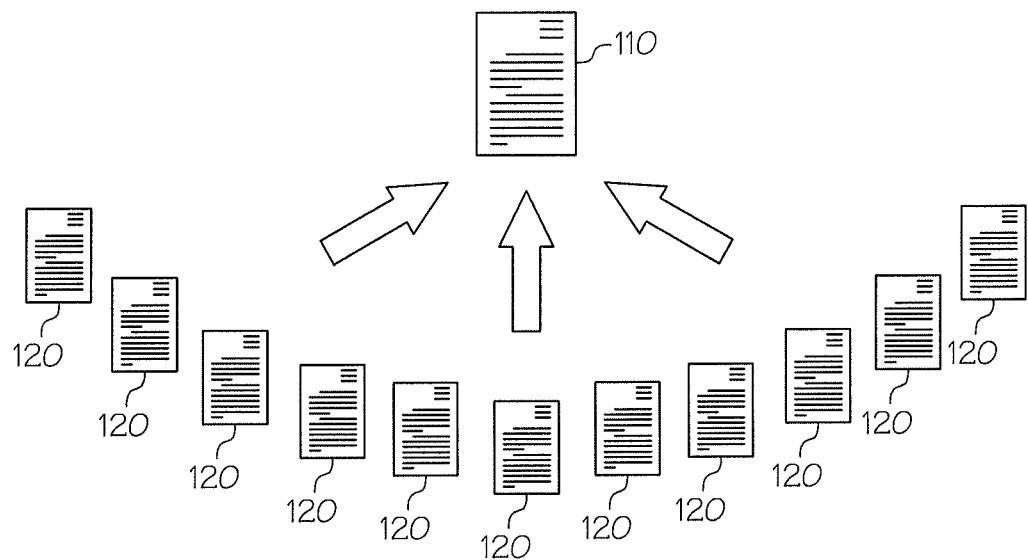
FIG. 1 is an exemplary illustration of representative citing instances to a cited document.

Embodiments described herein generally relate to increasing user productivity in determining a result set based on citations made for the same or similar reasons for citation (RFC).

In describing embodiments illustrated in the drawings, specific terminology is employed for the sake of clarity. However, these embodiments are not intended to be limited to the specific terminology so selected, and it is to be understood that each specific element includes all technical equivalents that operate in a similar manner to accomplish a similar purpose.

Embodiments may be described below with reference to flowchart illustrations of methods, apparatus (systems), and computer program products. It will be understood that each block of the flowchart illustrations, and combinations of blocks in the flowchart illustrations, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks.

The computer program instructions may also be loaded onto a computer or other programmable data processing apparatus to cause a series of operational steps to be performed on the computer or other programmable data processing apparatus to produce a computer implemented process such that the instructions which execute on the computer or other programmable apparatus provide steps for implementing the functions specified in the flowchart block or blocks.

Definitions

"Automatically" includes the use of a machine to conduct a particular action.

"Calculate" includes automatically determining or ascertaining a result using computer machine input.

"Citing Instance" includes the citation of a "cited" case X found in another "citing" case Y. For example, when *McDougall* v. *Palo Alto School District* cites *Ziganto* v. *Taylor*, the citation is referred to as "a citing instance of *Ziganto* in *McDougall*."

"Computer Machine" includes a machine (e.g., desktop, laptop, tablet, smartphone, television, server, as well as other current or future computer machine instantiations) containing a computer processor that has been specially configured with a set of computer executable instructions.

"Computer Machine Input" includes input received by a computer machine.

"Context of a Citing Instance" includes text around a citing instance of X. For example, the paragraph of a citing instance and the paragraphs before and after it are one example of a "context" of the citing instance.

"Corpus" refers to a collection of documents. "Corpora" refers to multiple collections of documents.

"Document Centric Concept Profile" includes metadata comprising significant terms, phrases, or concepts pertinent to a document that may or may not be found in the actual text of the document.

"Generate for Graphical Display" includes to automatically create, using computer machine input, an object(s) to be displayed on a GUI (e.g., a listing of hyperlinks, a heat map, a dashboard comprising a table, icon, and color-coding, etc.).

"GUI" or "Graphical User Interface" includes a type of user interface that allows users to interact with electronic devices via images (e.g., maps, grids, lists, hyperlinks, panels, etc.) displayed on a visual subsystem (e.g., desktop monitor, tablet/phone screen, interactive television screen, etc.). GUIs may be incorporated into a multi-modal interface including vocal/auditory computer machine input/output.

"Headnote" includes text that summarizes a major point of law found in an opinion, expressed in the actual language of the case document. In the case document, a headnote may or may not overlap with an RFC.

"Key Concepts" include a data mining effort to develop a list of concepts of varying levels of specificity/breadth to test a set of documents against. Such a key concept set may be customized to a specific genre such as the legal or scientific community. For instance, a legal concept (which may be a legal term), is a concept which has been shown to have either clear definitions within a standard legal resource such as a legal dictionary or that can be statistically shown to have greater relative prominence in legal corpora (e.g., cases, statutes, treatises, regulations, etc.) than in non-legal corpora (e.g., general newspapers). Legal concepts may be editorially or statistically derived.

"Metadata" includes a type of data whose purpose is to provide information concerning other data in order to facilitate their management and understanding. It may be stored in the document internally (e.g. markup language) or it may be stored externally (e.g., a database such as a relational database with a reference to the source document that may be accessible via a URL, pointer, or other means).

"Noise" includes words that occur in almost all input documents and therefore do not convey much about the content of any one document. Noise words are normally removed when analyzing content.

"Paragraph of a Citing Instance" includes the paragraph of some case that contains a citing instance. For example, the paragraph of *McDougall* v. *Palo Alto School District* that contains a citing instance of *Ziganio* v. *Taylor* would be called a paragraph of a citing instance of *Ziganto*.

"Reason for Citing/Citation" ("RFC") includes text, such as sentences in the context of a citing instance of X, that has the largest calculated content score, determined via a reason-for-citing algorithm, and that therefore likely indicates the reason a cited document was cited.

"Reason-for-Citing Algorithm" ("RFC algorithm") includes a computer-automated algorithm for identifying text in a first "citing" court case (or other document), near a "citing instance" (in which a second "cited" court case is cited or other type of second document), which indicates the reason(s) for citing (RFC). The RFC algorithm helps correctly locate RFC text areas as well as their boundaries in the document.

"Reference Value" includes a computer calculated factor associated with a document for a given legal concept based on the number of votes the cited case receives for that concept.

"Surfacing" comprises a variety of methodologies employed to made content stored in servers and connected to the Internet (or other network system) available for further review or selection. Content made available through surfacing may comprise a hierarchy of computer-selectable links or other information delivered as a result set to a query. A query includes a request for information entered via a user interface.

"Term-Frequency-Inverse-Document-Frequency" or "TF-IDF" includes a scoring mechanism comprising a numerical statistic which reflects how important a word is to a document in a collection or a corpus/corpora. Its value increases proportionally to the number of times a word appears in the document but is offset by the frequency of the word in the corpus, which helps to control for the fact that some words are generally more common than others.

"Text area" includes a generic term referring to where discussion occurs on a legal issue of interest in a document. The text area can be an RFC, a headnote, a combination thereof, or other defined text area.

With these definitions established, the structure and operation of various embodiments of systems and methods for identifying documents, based on citation history, are now described.

Referring to embodiments described in the present disclosure, metadata may be added to a document (e.g., a legal document, including judicial opinions, statutes, regulations, law reviews, treatises; a scientific document; or other type of document which includes citations) using a variety of indexing techniques including, but not limited to indexing based on the text of passages that have cited to the document. Embodiments may have previously utilized data-mining techniques to extract the issues from the corpus and store the issues in a repository, such as an issue library. Issue libraries may be stored in databases or in metadata. The process by which issues are extracted, organized and stored is a data-driven and largely automatic process and may utilize a computer network (e.g., wide area network, such as the internet, a local area network, a mobile communications network, a public service telephone network, and/or any other network and may be configured to electronically connect a user computing device (e.g., a PC) and a server computing device (e.g., butt, mainframe, or other server device).

A server may be specially configured or configured as a general purpose computer with the requisite hardware, software, and/or firmware. A server may include a processor, input/output hardware, network interface hardware, a data storage component (which stores corpus data, citation pairing metadata, reasons-for-citing metadata, and issue-library metadata) and a memory component configured as volatile or non-volatile memory including RAM (e.g., SRAM, DRAM, and/or other types of random access memory), flash memory, registeres, compact discs (CDs), digital versatile discs (DVD), and/or other types of storage components. A memory component may also include operating logic that, when executed, facilitates the operations described herein. An administrative computing device may also be employed to facilitate manual corrections to the metadata, if necessary.

A processor may include any processing component configured to receive and execute instructions (such as from the data storage component and/or memory component). Network interface hardware may include any wired/wireless hardware generally known to those of skill in the art for communicating with other networks and/or devices.

Such metadata may be utilized by search engines (e.g., Lexis Advance, Google, etc.) to move beyond mere TF/IDF searching to modes of semantic search or concept search investigation. This allows better matching of a user's actual cognitive intentions to produce search results since metadata underlying these results expands the range of target documents that can be matched to the literal queries entered by the user.

Legal-based document research (as well as other forms of research) benefits from such indexing to allow better assembly and construction of the building blocks of arguments. Such metadata helps prevent missing useful documents due to semantic misconnections by pushing/surfacing highly cited documents for specific propositions/concepts to the top of the result set. Embodiments do not merely rely on Document A cited Document B. Rather, embodiments utilize Document A cited Document B for the Purpose C to provide a rich source of metadata to establish a broad net for capturing content sources but also narrowing the catch to the documents with the highest citation (popularity) score. Embodiments may be disposed within established search engines or products, such as Lexis Advance.

Citation relations are valuable information embedded within a corpora (e.g., a legal corpora). In a legal setting, an attorney may search for previous cases that have been significantly referenced for a particular issue or concept. But a single document or case may cover many concepts and might be cited for one or more reasons. Thus, documents may be multi-topical. Additionally, among documents concerning a similar topic, different words might be used to convey that topic. Thus, citation based relations are semantic by nature since they link together concepts that are similar in meaning that may be outwardly expressed in different ways.

Tools exist for helping attorneys find preferred cases discussing specific legal concepts of interest (e.g., Shepard's, Shepardize narrowed by headnote, Legal Issue Trail a.k.a. Citation Network Viewer) and legal search engines with activity scores. Even with these tools, however, a user must work carefully, diligently and with significant time consumption to get the one or more cases that have been most heavily referenced for the specific legal concept in question.

Using various techniques, a citation-pairing metadata file may be developed containing one-to-one pairing information between a reason-for-citing of a citing documents and a reason-for-citing/cited-text-area of a cited document. Embodiments disclosed within may utilize techniques disclosed in U.S. patent application Ser. No. 12/869,456 entitled "Systems and Methods for Generating Issue Libraries Within A Document Corpus" to develop a metadata file that can be manipulated to achieve the functions disclosed herein. Other methods of establishing metadata, known to those of skill in the art, may also be utilized to form a base on which to practice the functions disclosed herein (e.g., metadata may be organized in a variety of taxonomies depending on the level of speed and accuracy desired by the system).

These metadata files may be utilized to determine how many times a cited document has been cited for a given reason-for citation. Thus, when multiple citations to one case all have references to the same legal concept, a computer machine specially programmed to execute an algorithm calculates a higher reference value for that case as it relates to that specific legal concept.

A reference value associated with a first document may be calculated based on a straight count of the number of times that first document was cited for a given normalized legal concept. Alternatively, if a case is cited by a large number of citations for different points then the final count may be adjusted as compared to a case which is being cited for a single point. For example, 393 U.S. 503 was the most cited case for the concept of "freedom of speech". It was also cited for 402 other concepts/reasons for citation. Alternative embodiments may utilize this kind of information to adjust a reference value based on how concentrated the case is to the discussion (large number of concepts might mean broad discussion resulting in a lower reference value; whereas, a single or few concepts, associated with a given case, may mean a more focused discussion on the given concept resulting in a higher reference value).

In some embodiments, citations act as a voting community and automatically "vote" on the cited cases with sets of terms representing legal concepts found in reasons for citation (RFC). RFC may be the text area around a citation, whose starting and ending boundaries are determined by a small set of rules. The system automatically calculates the case that receives the most votes or citations for a given concept/RFC and surfaces that case as the most prominent/significant for that concept/RFC. The voting results indicate reference values of cases for individual legal concepts. This reference value may work together with other factors to help attorneys in their use of case citations in real practice (i.e., if a more relevant case is surfaced using the techniques disclosed herein, it may make sense to replace the originally cited case with the surfaced case in order to cite the most popularly and possibly more familiar or authoritative case for that concept/RFC). Embodiment disclosed herein automatically invert the RFC to find which cases cite it most frequently out of the corpus/corpora of all the cases/documents. This process may be performed on a continuing basis to adjust scores when new documents are added to the corpus that may contain additional citations.

Alternatively, scoring may be implemented by first eliminating those cases that have only one citation for a given reason-for-citation. This may provide for more efficient tabulation of the reference values associated with the remaining cases. Other techniques may be employed to increase efficiency known to those of skill in the art.

Referring to FIG. 1, for example, the cited case "Wainwright v. Simpson, 360 F.2d 307" (110) was cited 78 times ((120) in FIG. 1 represents the citing instances). Once a reason for each citation is established (e.g., via a reason-for-citing algorithm), those reasons may be automatically compared to a key concept list so that a key legal concept may be identified for each citation (which cites to the cited case). Since the concepts are extracted from the RFC areas, they are closely related to the cited case.

Figure 2:
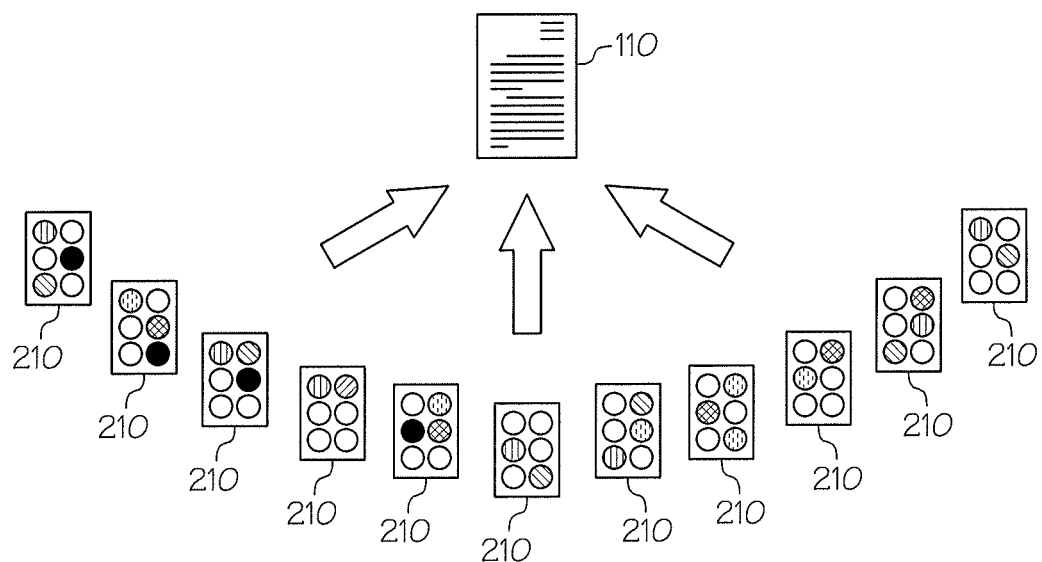
FIG. 2 is an exemplary illustration of legal concepts represented in an exemplary set of citing instances from FIG. 1.

Referring to FIG. 2, a set of shaded balls (210) represent different key legal concepts found within the citing texts (120). In a given example, some concepts may stand out for a given case (e.g., 14 citations with a RFC of "right to appeal," 11 citations with a RFC of "court appointed counsel," and 7 citations for "right to move for a new trial"). RFCs may be automatically identified/compiled from the corpus as well. Each RFC may comprise a block of text and it is assumed that with each RFC there may be instances of key concepts drawn from process which mined key concepts/terms from the corpus.

Figure 3:
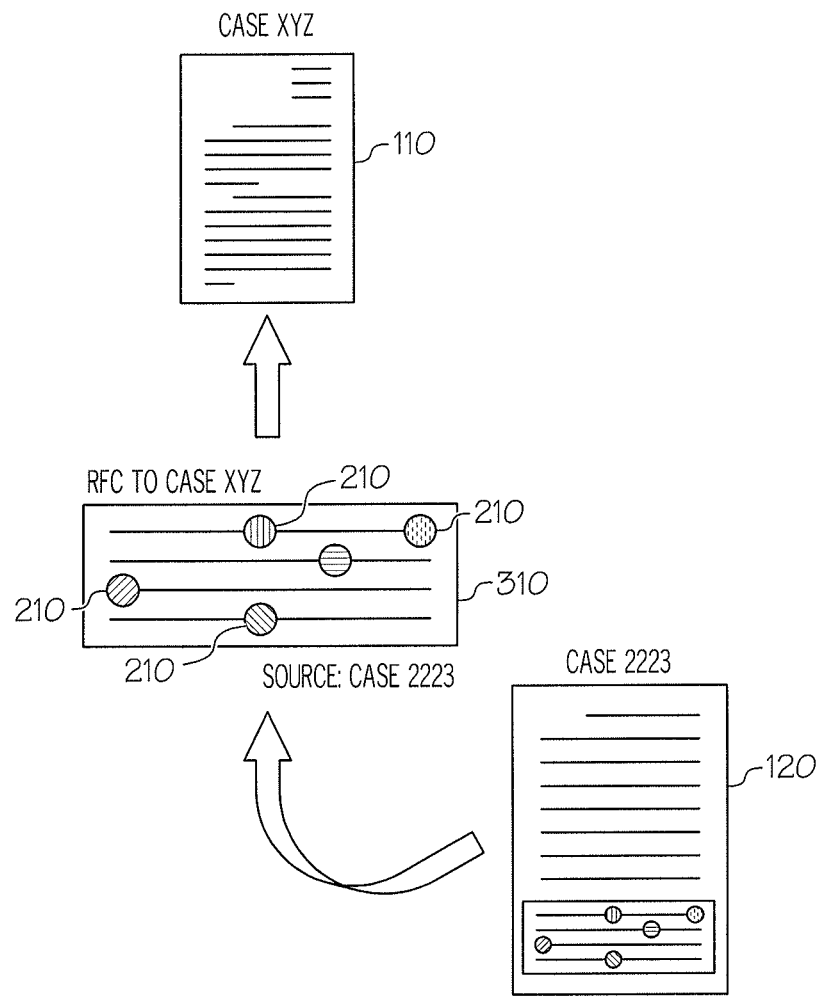
FIG. 3 is an exemplary illustration representing a set of legal concepts within a reason for citation being pulled out of a citing instance to be matched against a cited document.
Figure 4:
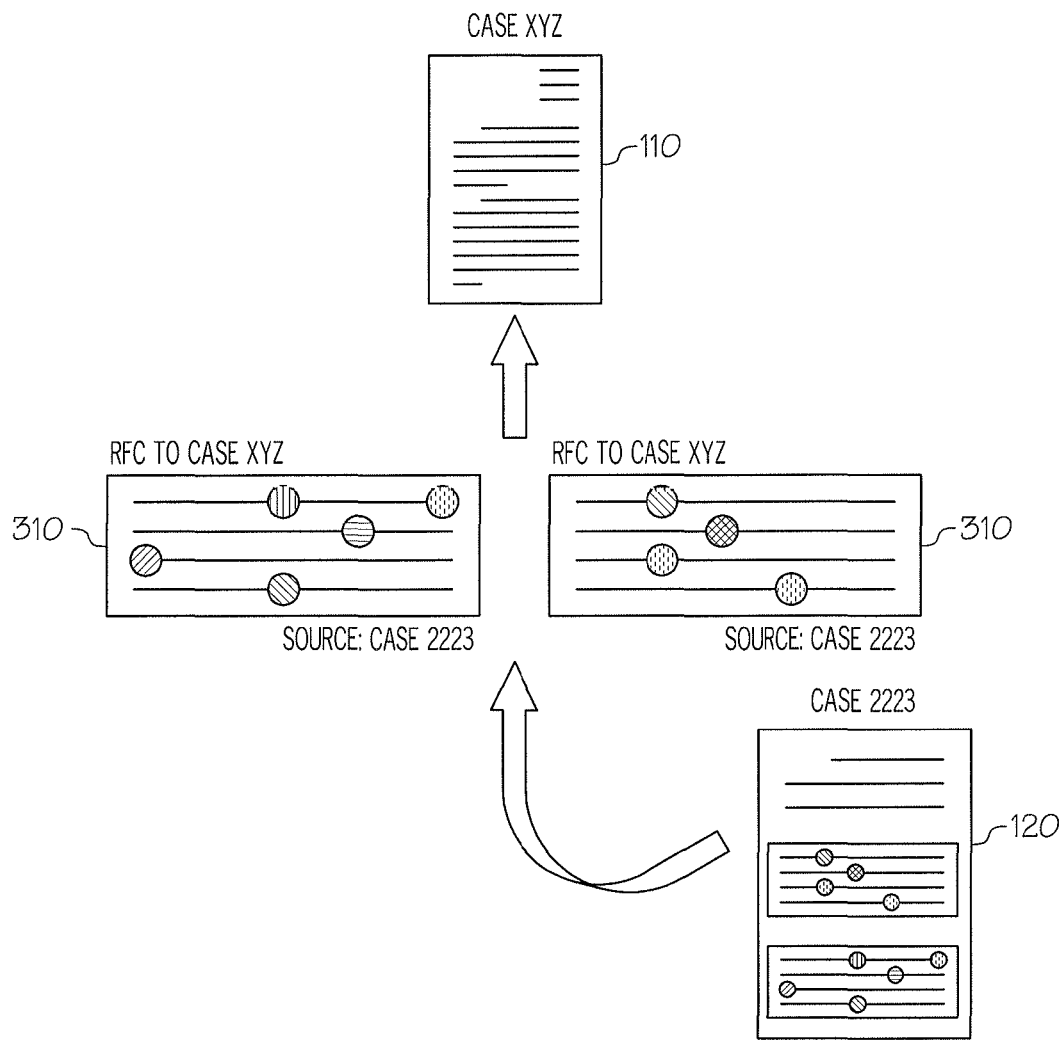
FIG. 4 is an exemplary variation of FIG. 3 showing two differing sets of legal concepts disposed within two differing reasons for citation between the citing instance and the cited document.

Referring to FIG. 3, a single RFC (310) to Case XYZ (cited by Case 2223) may contain a set of key legal concepts where each of the multiple key legal concepts (210s) is represented in this figure a shaded ball(s) distinguished by various shading patterns. Each shading pattern represents a distinct key legal concept. Referring to FIG. 4, a citing instance, Case 2223 (120), may have multiple RFCs (310) (each comprising a different set of legal concepts) referencing a cited document (110). In this example, the two RFCs (310) include two matching legal concepts (designated by a) the shaded ball(s) comprising dashed vertical lines, and b) the shaded ball(s) comprising backwards slanted lines). Thus, Case XYZ (110) may receive a higher relevancy score because, in two separate RFC instances, it was cited for a given legal concept represented by an associated shading scheme. Similar results may be obtained if the RFCs with the matching legal concepts come from different citing cases.

In a hypothetical example, a search is conducted against the entire corpus to determine which case has the most citations for a specific concept (e.g., the concepts "right to appeal" and "court appointed counsel"). In this hypothetical scenario, *Martinez v. Yist*, 951 F.2d 1153, was cited 8,302 times for "right to appeal" and *Anders v. California*, 386 U.S. 738, was cited 2,427 times for "court appointed counsel. Therefore, these cases are the "winners" for those concepts.

More examples of highest citation winners for a given concept are presented in the following table:

| CONCEPT | CASE | CITATION | # of CONCEPT REFERENCES |
|---|---|---|---|
| Sixth Amendment | Strickland v. Washington | 466 U.S. 668 | 13,066 |
| Abuse of Discretion | Blakemore v. Blakemore | 5 Ohio St. 3d 217 | 7,859 |
| Court Erred | Blakely v. Washington | 542 U.S. 296 | 2,150 |
| Employment at Will | Mers v. Dispatch Printing Co. | 19 Ohio St. 3d 100 | 716 |
| Assigned Error | Anders v. California | 386 U.S. 738 | 1,722 (but, "assigned error" did not occur in that case so this represents an example of a normalized search) |
| Miranda Warning | Miranda v. Arizona | 384 U.S. 436 | 4,231 |
| Fruit of the Poisonous Tree | Wong Sun v. United States | 371 U.S. 471 | 2,637 |
| International Shoe | International Shoe Co. v. Washington | 326 U.S. 310 | 15,779 |
| Notion of fair play | International Shoe Co. v. Washington | 326 U.S. 310 | 8,784 |

Figure 5:
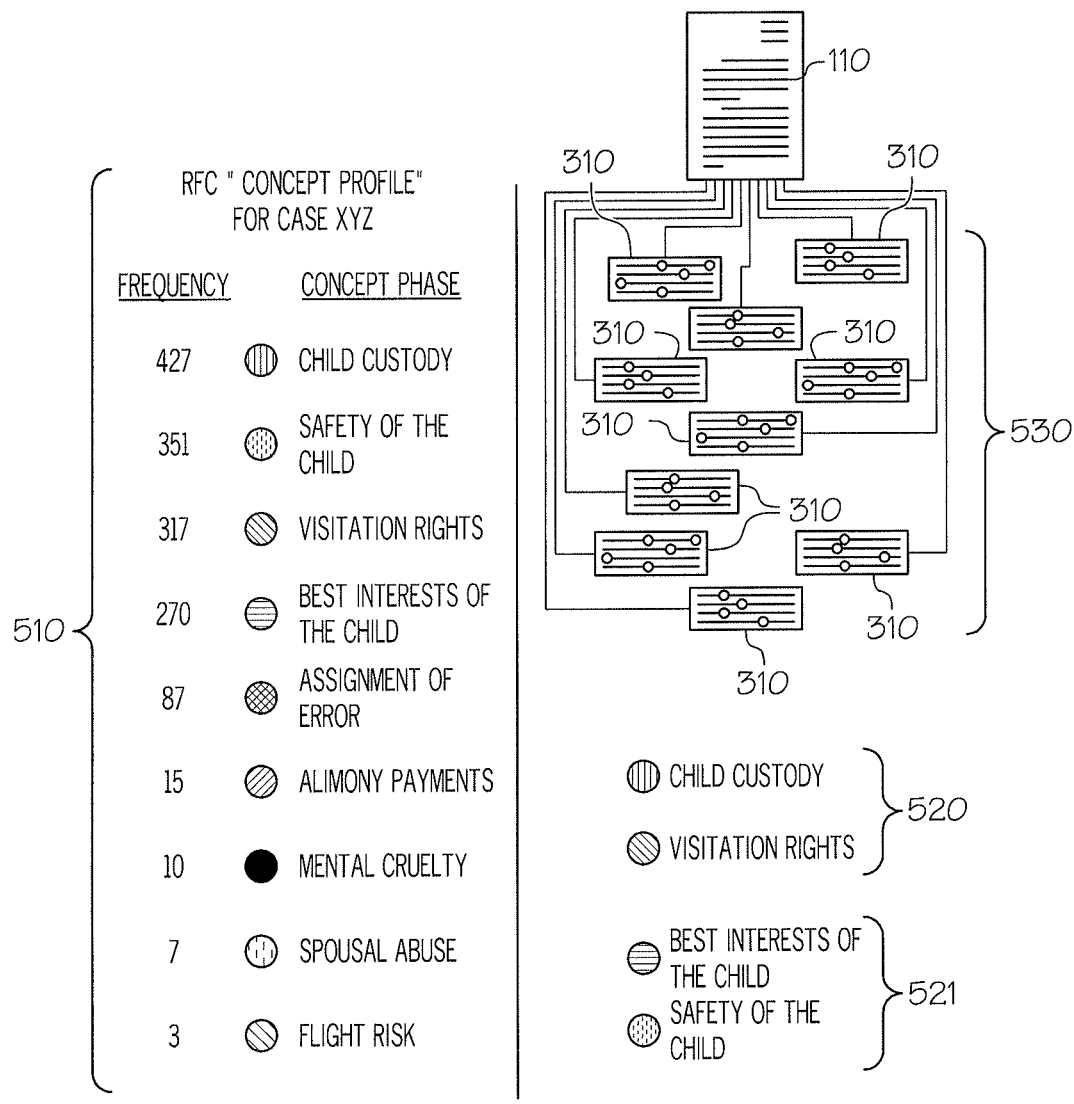
FIG. 5 illustrates an exemplary document centric concept profile for a cited document as well a sample of concept clustering.
Figure 6:
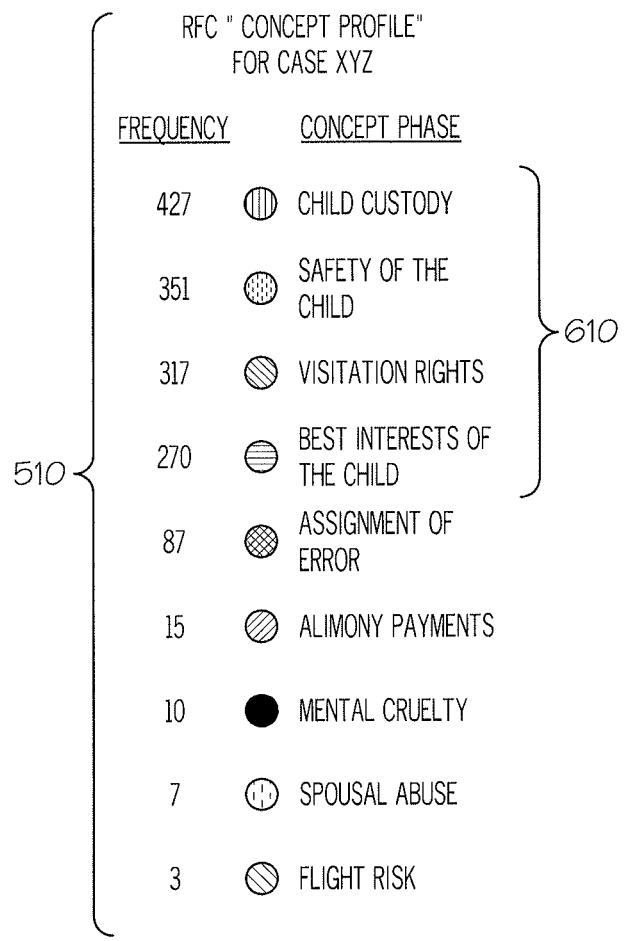
FIG. 6 illustrates an exemplary tailored document centric concept profile.

Referring to FIG. 5, in an embodiment, a compilation (530) of reasons for citation (RFCs) (310s) may be automatically mapped to one or more target documents (110 . . . ) to create a document centric concept profile (510) that may include terms or phrases pertinent to Case XYZ, yet not actually found in its surface text. As these RFC's are assembled for each document, counts can then be made of the "concepts" that are referenced in the RFC's. The resulting set of "concept counts" then automatically generates a new metadata profile, called a document centric concept profile (510), for the target document (110). It may be possible for overlap to exist between the association of documents based on the RFC-derived profiles and core terms from the text of the document itself but, in general, the former will augment the latter. It may also be further possible to automatically analyze the data developed from basic concept counts to create multiple metadata profiles or sub-profiles geared toward a specific purpose. In a variation, extra weight may be given to concepts derived from a "famous" or seminal document in the citing pool. In another embodiment, terms may be automatically placed into clusters (520, 521) based upon their overall patterns of semantic distance to one another. Different profiles could be active to work in different user scenarios. Referring to FIG. 6, a subset of concepts (610) based on a threshold concept's frequency count may surface a different set of results. Once a profile is created, it may be automatically associated with the target document through various means including 1) storing the new metadata directly with the document; or 2) placing the metadata in a derivative database that can be accessed by different product applications for specific purposes.

Figure 7:
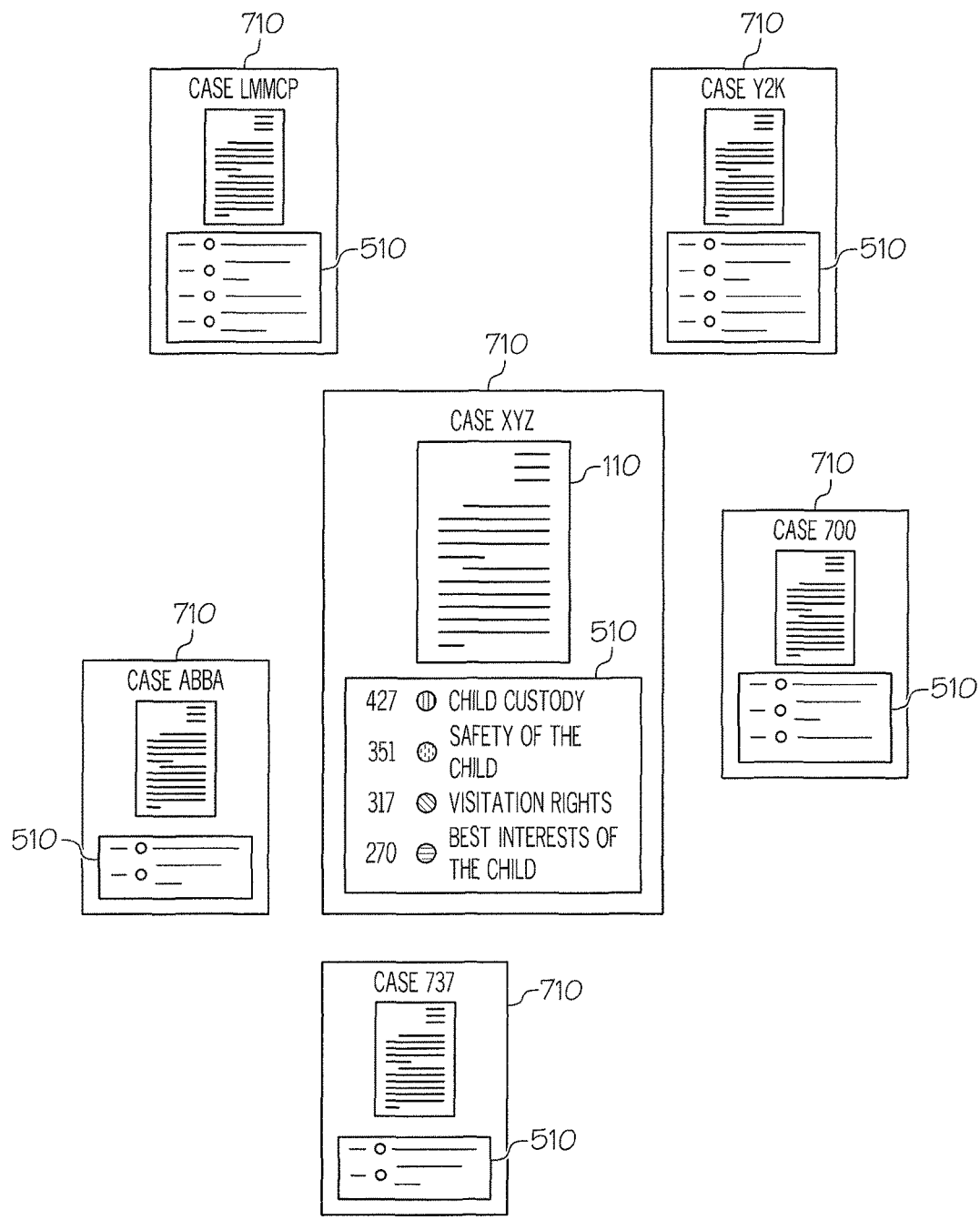
FIG. 7 illustrates an exemplary set of documents within a sample corpus wherein each document has been associated with its own sample document centric concept profile.

Referring to FIG. 7, once a set of document centric concept profiles (510) have been created for each case (e.g., Case LMMCP, Case Y2K, Case ABBA, etc.), all major forms of documents (710) within a system (for a legal document corpus this may include case opinions, statutes and regulations) may be automatically associated with one or more document centric concept profiles (510). In some embodiments, documents (710) can be automatically compared to one another based on these RFC-driven document centric concept profiles (510) (other scoring mechanisms, e.g., TF-IDF, for each document may exist as well). Even if a document obtains a high score on Legal Concept A (through an alternative scoring mechanism such as TF-IDF), it may only rate a moderate score when compared to other documents cited for the same concept when the score is based on a the number of "votes" it receives for that concept by other citing documents. Likewise, a document might achieve only a low score using an alternative scoring mechanism but turn out to be a document that is actually cited to frequently for a specific concept and thereby be surfaced through this "voting" mechanism. Thus, various embodiments described herein may provide a result set that can be used to fine-tune results from more traditional methods and/or provide a different result set for either direct consumption or for comparison purposes to the traditional methods.

RFC data may be automatically created by extracting all citations for documents in a corpus residing in computer-readable storage (e.g., a MarkLogic server) with the citing texts (RFC) and the case identification numbers (IDs) of the cited cases. Key legal concepts may be automatically identified and normalized by utilizing a smaller subset of concepts (e.g., high-value legal concepts) and normalizing those terms into standard forms. The list may be automatically reviewed to remove noise—concepts that are not germane to a given purpose or redundant concepts may be combined.

Data may also be inverted so that cases referred to in citations with the same concept are grouped together to allow for searching and other operations. For instance, a user may initially determine the case for which "summary judgment" is most often cited and then flip the result set to show the cases for which that term appeared most frequently.

Embodiments may be offered via a GUI on a desktop, laptop, tablet, smartphone, or other mobile environment and include various operating systems. Referring to FIG. 8, an embodiment generates a GUI which allows a user to enter a query (810) (e.g., "What is a prima facie showing that the best interests of a child may be served?") as computer machine input. By breaking down the concepts in the query, several result sets (820) may be developed (e.g., "prima facie", "best interest", "best interest of the child", and more). For each case surfaced under a concept result set, a tabulation of the number of times that case was cited (830) for that particular concept may be revealed (e.g., 411 *U.S.* 792 was cited over 20,190 times for the concept of "prima facie"). This data may be entered into a document concept profile for each of these cases to allow quicker access, via a database, for the case for which the most votes have been received on a particular concept. Each case may be further hyperlinked to a back-end document so that its full text or a relevant portion thereof may be read by a user.

In some embodiments, for a given legal concept, a user is led to the most significant cases directly without having to sift through a long list of cases. A user may then use Shepard's, Legal Issue Trail, Lexis Advance or other Lexis services to do subsequent research. Embodiments may identify significant cases that search engines may fail to find due to the lack of term identity between the concept searched and the language of the case. In some embodiments, a case is determined to be more significant than another, for a given concept, if it is cited more times for that concept. For example, if the query is for "abuse of discretion", *Blakemore* v *Blakemore* (5 Ohio St. 3d 217) (cited over 7859 times) is considered more significant than *State* v. *Adams* (62 Ohio St. 2d 151) (cited over 2633 times). In this embodiment, a typical search engine might surface *State* v. *Adams* higher, however, because *Blakmore* v. *Blakemore* cites to *State* v. *Adams* and it was *State* v. *Adams* which initially defined the term "abuse of discretion".

Referring to FIG. 9, these concepts may be normalized and merged. User queries and terms in case documents may undergo a normalization process to help matching and grouping of concepts and potentially surface even more precise results. In an example query, "no negligence" may be entered into the search bar. By normalizing the query terms, 68 *N.Y.* 2*d* 320 may be surfaced as having been cited for "absence of negligence" and other varied forms of this same legal concept over 98 times.

Figure 10A:
FIG. 10(A-B) represent two examples of an embodiment of an exemplary interface generated for graphical display, providing a query box and illustrating the same result set due to normalizing each of the two sets of query terms received as computer machine input.
Figure 10B:

Referring to FIGS. 10A-B, even when different query terms are entered (e.g., "driving under the influence" versus "driving while intoxicated" or any of dozens of other forms of this Concept), the normalization process surfaces the same concept (e.g., "DUI") and most significant case (e.g., 384 *U.S.* 757) which was cited over 339 times for the DUI concept. In embodiments disclosed herein, a corpus of material (e.g., legal material, scientific material, or other material containing citations) may be automatically mined to find statistically common terms and phrases. Once the phrases are found, they may be automatically analyzed through a patented process that identifies phrases which are essentially variants of one another. See, U.S. Pat. No. 5,926,811, Statistical Thesaurus, Method of Forming Same, and Use Thereof in Query Expansion in Automated Text Searching, and U.S. Pat. No. 5,819,260, Phrase Recognition Method and Apparatus, which are hereby incorporated by reference. See also, U.S. patent application Ser. No. 12/869,400, Systems and Methods for Lexicon Generation, which is also hereby incorporated by reference. These phrase clusters may be automatically normalized by representing them with their leading exemplar which may be the most commonly used variant of the phrase. The normalization process allows for varied linguistic forms of the same concept to collapse into the same term to increase the chance for terms to group under the same concept. For instance, "safety of the child" may be the leading exemplar for child's safety, safety of the child, children's safety, safety of children, child safety, child's health and safety, safety of a child, safety of her children, child's health or safety, minor's safety, safety of the minor, safety of school children, etc. In aggregate, this method may identify any number of key terms and phrases under one normalized master entry. In embodiments disclosed herein, a range for the number of key terms and phrases may be present (e.g., 10,000-20,000), user-defined and/or dependent on the size of the corpus sampled. In another embodiment, a set of search results may be enhanced by broadening the scope of pertinent concepts available to match query terms. For example, some legal concepts used in citations do not occur in the actual text of the cited case which would ordinarily cause such cases to be missed.

*Anders* v. *California*, 386 *U.S.* 738, was cited 1,722 times for "assigned error/assignment of error" but these terms do not occur in the text of the case opinion.

*Blakely* v *Washington*, 542 *U.S.* 296, was cited 2,150 times for "court erred" but, again, the term does not occur in the actual text of the opinion.

Thus, the various embodiments disclosed herein illustrate different ways in which citations may be used to link together documents within a corpus including, but not limited to, systems and techniques to determine which case is most frequently cited for a specific Legal Concept. It is to be understood that the present embodiments are not limited to the illustrated user interfaces or to the order of user interfaces described herein. Various types and styles of user interfaces may be used in accordance with the present embodiments without limitation. Modifications and variations of the above-described embodiments are possible, as appreciated by those skilled in the art in light of the above teachings. It is therefore to be understood that, within the scope of the appended claims and their equivalents, the embodiments may be practiced otherwise than as specifically described.

We claim:

1. A method to identify a document within a corpus of documents generated as a result of a bibliometric process for the purposes of determining whether the document is a most frequently cited document for a reason for citation, the method comprising automatically:

receiving a query from a graphical user interface comprising one or more concepts;

normalizing a set of terms or concepts in the query to create a normalized query;

comparing the normalized query to a set of document centric concept profiles, wherein each document centric concept profile is associated with a document in the corpus, and wherein each document centric concept profile comprises:

a plurality of key concepts identified by:
establishing a reason for citation associated with each citing instance that has cited the document associated with that document centric concept profile, wherein each reason for citation is based on a text area within each respective citing instance; and comparing each reason for citation to a normalized key concept list to identify at least one key concept; and a reference value for each key concept, wherein the reference value is calculated by tabulating a number of times the document associated with that document centric concept profile has been cited by citing instances for each key concept; and surfacing a particular document from the corpus, the particular document having a highest reference value for a key concept corresponding to the normalized query, wherein the particular document is the most frequently cited document for the reason for citation.

2. The method of claim 1, wherein the set of terms or concepts from the query are not present in the particular document surfaced from the corpus.

3. The method of claim 1, wherein one or more document centric concept profiles of the set of document centric concept profiles comprises a reference value assigned to a cluster of concepts.

4. The method of claim 1, wherein the surfacing occurs for the particular document from the corpus based on a subset of the set of document centric concept profiles.

5. The method of claim 4, wherein the corpus comprises documents chosen from a set of case opinions, statutes, and regulations.

6. The method of claim 5, wherein the particular document from the surfacing, when scored using Term-Frequency-Inverse-Document-Frequency techniques, has a lower score and a higher reference value than a second document.

7. The method of claim 1, wherein at least one document in the corpus is associated with more than one document centric concept profile.

8. The method of claim 1, wherein surfacing the particular document from the corpus comprises generating a user interface component that includes the particular document at the top of a list of search results.

9. A non-transitory computer-readable memory comprising computer-executable instructions for execution by a computer machine to identify a document within a corpus of documents generated as a result of a bibliometric process for the purposes of determining whether the document is a most frequently cited document for a reason for citation, the computer-executable instructions, when executed, cause the computer machine to:

receive a query including at least one concept;

compare the at least one concept of the query to each document centric profile of a set of document centric concept profiles contained in a corpus located in a computerized database, wherein each document centric concept profile comprises:

a plurality of key concepts identified by:

establishing a reason for citation associated with each citing instance that has cited the document associated with that document centric concept profile, wherein each reason for citation is based on a text area within each respective citing instance; and comparing each reason for citation to a normalized key concept list to identify at least one key concept; and a reference value for each key concept wherein the reference value is calculated by tabulating a number of times the document associated with that document centric concept profile has been cited by citing instances for each key concept;

surface a set of documents, wherein each document of the set of documents is associated with a document centric concept profiles having a key concept that matches the at least one concept of the query; and rank the set of documents by their respective reference value associated with the key concept that matches the at least one concept of the query, wherein the highest-ranked document of the set of documents represents the most frequently cited document for the reason for citation.

10. The non-transitory computer-readable memory of claim 9, wherein the computer machine is chosen from the group consisting of: a mobile device, a desktop, and a laptop.

11. The non-transitory computer-readable memory of claim 9, wherein the query includes multiple concepts.

12. The non-transitory computer-readable memory of claim 11, wherein the multiple concepts form a concept cluster.

13. The non-transitory computer-readable memory of claim 12, wherein the computer-executable instructions are further configured to compare the concept cluster to each document centric concept profile of the set of document centric concept profiles.

14. A system to identify a document within a corpus of documents generated as a result of a bibliometric process for the purposes of determining whether the document is a most frequently cited document for a reason for citation, the system comprising:

a processing device; and a non-transitory, processor-readable storage medium, the non-transitory processor-readable storage medium comprising one or more programming instructions that, when executed, cause the processing device to:

receive a query from a graphical user interface comprising one or more concepts;

normalize a set of terms or concepts in the query to create a normalized query;

compare the normalized query to a set of document centric concept profiles, wherein each document centric concept profile is associated with a document in the corpus, and wherein each document centric concept profile comprises:

a plurality of key concepts identified by:

establishing a reason for citation associated with each citing instance that has cited the document associated with that document centric concept profile, wherein each reason for citation is based on a text area within each respective citing instance; and comparing each reason for citation to a normalized key concept list to identify at least one key concept; and a reference value for each key concept, wherein the reference value is calculated by tabulating a number of times the document associated with that document centric concept profile has been cited by citing instances for each key concept; and surface a particular document from the corpus, the particular document having a highest reference value for the key concept corresponding to the normalized query, wherein the particular document is the most frequently cited document for the reason for citation.

15. The system of claim 14, wherein the set of terms or concepts from the query are not present in the particular document surfaced from the corpus.

16. The system of claim 14, wherein one or more document centric concept profiles of the set of document centric concept profiles comprises a reference value assigned to a cluster of concepts.

17. The system of claim 14, wherein the one or more programming instructions that, when executed, cause the processing device to surface the particular document further cause the processing device to surface the particular document from the corpus based on a subset of the set of document centric concept profiles.

18. The system of claim 17, wherein the corpus comprises documents chosen from a set of case opinions, statutes, and regulations.

19. The system of claim 18, wherein the particular document from the surfacing, when scored using Term-Frequency-Inverse-Document-Frequency techniques, has a lower score and a higher reference value than a second document.

20. The system of claim 14, wherein at least one document in the corpus is associated with more than one document centric concept profile.

* * * * *

UNITED STATES PATENT AND TRADEMARK OFFICE
CERTIFICATE OF CORRECTION

PATENT NO. : 10,372,717 B2
APPLICATION NO. : 14/922585
DATED : August 6, 2019
INVENTOR(S) : Paul Zhang et al.

Page 1 of 1

It is certified that error appears in the above-identified patent and that said Letters Patent is hereby corrected as shown below:

In the Specification

In Column 3, Line 23, delete "FIG. 10(A-B)" and insert --FIGS. 10(A-B)--, therefor.

Signed and Sealed this
Tenth Day of December, 2019

Andrei Iancu
*Director of the United States Patent and Trademark Office*